United States Patent [19]

Ersdal et al.

[11] Patent Number: 4,728,043

[45] Date of Patent: Mar. 1, 1988

[54] MECHANICAL SORTING SYSTEM FOR CRUDE SILICON CARBIDE

[75] Inventors: Harald Ersdal; Kjell A. Stole, both of Lillesand, Norway

[73] Assignee: Norton Company, Worcester, Mass.

[21] Appl. No.: 352,440

[22] Filed: Feb. 25, 1982

[51] Int. Cl.⁴ .............................................. B02C 17/02
[52] U.S. Cl. ........................................ 241/14; 241/24; 241/26; 134/104; 209/683
[58] Field of Search ................. 241/14, 24, 26, 69, 241/73, 79, 79.2, 79.3, 80, 97, 284; 366/27-29; 134/104, 109; 209/288, 680, 683

[56] References Cited

U.S. PATENT DOCUMENTS

| | | |
|---|---|---|
| Re. 11,473 | 2/1895 | Acheson . |
| 847,436 | 3/1907 | Pfeiffer .......................... 241/179 X |
| 965,813 | 7/1910 | Greist .............................. 241/79.3 X |

*Primary Examiner*—Timothy V. Eley
*Attorney, Agent, or Firm*—Rufus M. Franklin

[57] ABSTRACT

A process for purifying crude silicon carbide lumps from an Acheson furnace comprising agitating the lumps in a drum having a cylindrical wall, its axis substantially horizontal and having openings of controlled size, smaller than said crude lumps, in said cylindrical wall, separating the particles passing through said controlled size openings according to size and recirculating oversize particles back to said rotating drum and finally recovering product retained in said drum.

3 Claims, 1 Drawing Figure

U.S. Patent
Mar. 1, 1988
4,728,043
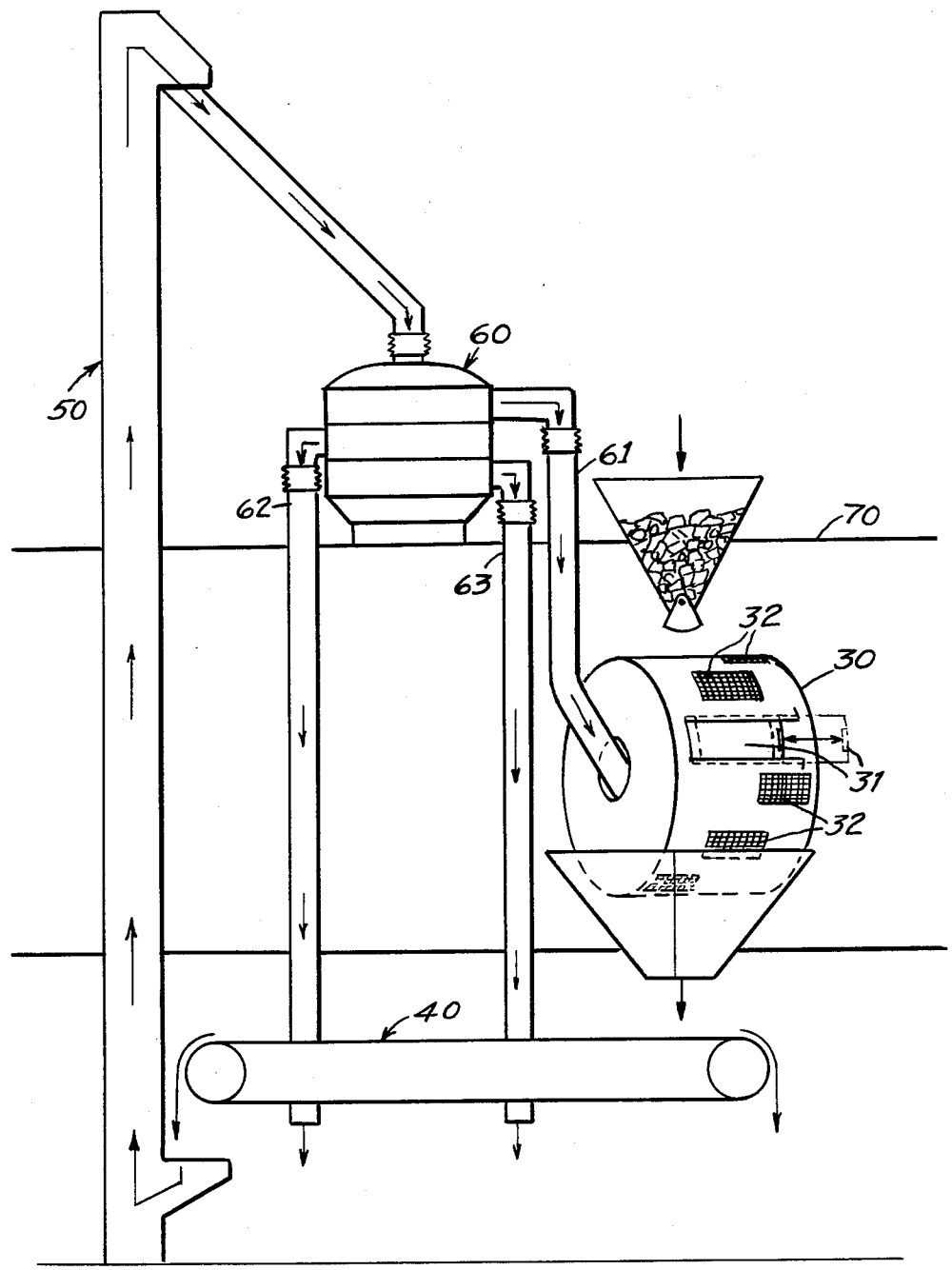

MECHANICAL SORTING SYSTEM FOR CRUDE SILICON CARBIDE

FIELD OF THE INVENTION

This invention relates to a process for separating high quality silicon carbide product from a silicon carbide resistance furnace pig.

BACKGROUND OF THE INVENTION

In the manufacture of silicon carbide, the resistance furnace method, disclosed in Acheson U.S. Pat. No. Re. 11,473 of Feb. 26, 1895, the product pig is normally of roughly circular cross section surrounded by unreacted mix. There is a crust (white zone) high in silica on the outside surface of the pig, and inside of that is a partially reacted zone of "firesand" typically containing 40% silicon carbide. Inside of the firesand zone is a region of essentially 100% reacted material. At the center of the pig is a graphite core, the remains of the resistance element of the furnace.

The present invention provides a mechanical means of separating the unreacted material in the fire sand zone from the silicon carbide in the pig, after removal of the crust (white zone) and the graphite.

THE DRAWINGS

The drawing shows a schematic view of an apparatus for carrying out the invention.

BRIEF SUMMARY OF THE INVENTION

After removal of the crust (white zone) the silicon carbide pig is cut into blocky pieces having typically a maximum dimension of about 1 foot (30 cms), and the graphite is removed from the center portion of the pieces. The crude lumps of the pig are then charged into the drum 30 through access door 31. Rotation of the drum is then begun. The weaker fire sand portions of the pig are preferentially broken away and fall through the screen openings 32 in the drum periphery. A reversible conveyer belt 40, the top portion of which selectively travels to the left or right in the FIGURE, carries material which has passed through the screens in the drum to a bucket elevator 50, which carries the particles to a vibratory screener 60 which rejects and classifies by size, the undersize material and returns coarser pieces back to the drum 30 by way of conduit 61. Such pieces, although smaller than the openings in screens 32, are retained in the drum long enough to break away additional fine, unreacted material from silicon carbide product.

After a predetermined period for recycling, the retained product from the screen and the material in the drum are collected as product.

The drum 30 may rotate as described or it may be stationary and instead include internal moving agitation means for impacting the crude lumps.

Instead of batch operation, the process may be made continuous by continuous feeding of the drum and withdrawal of product from the drum; as will be evident to one skilled in the art of material handling.

The vibratory screener 60 may consist of several screens for the segregation of rejected material into group sizes. The coarser of the rejected material being of higher quality, may be recovered through conduit 62 for certain use or as feed for a furnace run, while the less valuable finer material is separately collected through conduit 63.

The drum 30 is shown as enclosed within duct work 70 for containment of noise and dust.

A particular advantage of the present process is the ability to contain or reduce the undesireable noise and dust effects of prior art hand sorting methods.

DESCRIPTION OF SPECIFIC EMBODIMENT OF THE INVENTION

In a typical batch process operation of the apparatus described above, a charge of 1500 kilograms of crude silicon carbide in large lumps is placed into the drum 30. The screens 32 of the drum 30 are rectangular, 300 mm by 450 mm, and have square openings 25 mm on a side.

A sliding door or gate 31 is closed and the drum is rotated by motor means, not shown, at a rate of 12 rpm.

As the 30 cm lumps are broken up, particles fall through the screen 32, to conveyor belt 40 and up bucket elevator 50 to vibratory screener 60. Lumps which are retained on a 3.36 mm mesh screen are fed back to drum 30 through conduit 61. The drum, has a diameter of 195 cm and a length of 170 cm. After, for example, 12 minutes of operation, for a single load of 1500 kilograms, the contents of the drum is emptied onto conveyer 40, now reversed and travelling to the right, and the product is collected. In a typical run, the product yield is 80% compared to a yield of 50% for typical hand sorting. Various modifications can be made in the process and apparatus shown and described above. The particular sizing of the screens and rotation rate and recirculation times may be varied depending for example, on the particular character of the crude pig. Particularly in the case of a continuous process, a second rotating drum may be employed in series with the drum 30.

What is claimed is:

1. A method for separating unreacted and partially reacted material from a crude silicon carbide resistance furnace pig comprising breaking the pig into lumps, agitating said lumps in a horizontal drum having screen openings in its cylindrical surface, collecting the material passing said screen and recirculating a portion of said material, larger than a fixed minimum size, back to said drum, and collecting as product material retained in said drum after a predetermined period of operation.

2. A method as in claim 1 in which said drum rotates about its axis.

3. A method as in claim 1 wherein the drum is enclosed to prevent escape of dust to the environment.

* * * * *